United States Patent [19]

Sircar

[11] Patent Number: 4,472,177
[45] Date of Patent: Sep. 18, 1984

[54] CONTROL SYSTEM AND METHOD FOR AIR FRACTIONATION BY VACUUM SWING ADSORPTION

[75] Inventor: Shivaji Sircar, Wescosville, Pa.

[73] Assignee: Air Products and Chemicals, Inc., Allentown, Pa.

[21] Appl. No.: 416,433

[22] Filed: Sep. 9, 1982

[51] Int. Cl.³ .................................. B01D 53/04
[52] U.S. Cl. .................................. 55/21; 55/26; 55/58; 55/62; 55/163; 55/179
[58] Field of Search ............ 55/18, 21, 25, 26, 33, 55/58, 62, 68, 74, 75, 161-163, 179, 180, 387, 389

[56] References Cited

U.S. PATENT DOCUMENTS

| Re. 29,941 | 3/1979 | Bird | 55/21 |
|---|---|---|---|
| 3,257,314 | 6/1966 | Kitchen | 210/30 |
| 3,257,772 | 6/1966 | Maddox et al. | 55/20 |
| 3,338,030 | 8/1967 | Feldbauer, Jr. | 55/25 |
| 3,448,561 | 6/1969 | Seibert et al. | 55/20 |
| 3,540,188 | 11/1970 | Barrere, Jr. et al. | 53/30 |
| 3,659,399 | 5/1972 | Kauer, Jr. | 55/33 |
| 3,703,068 | 11/1972 | Wagner | 55/21 |
| 3,775,946 | 12/1973 | Brazzel | 55/58 |
| 3,923,477 | 12/1975 | Armond et al. | 55/25 |
| 4,013,429 | 3/1977 | Sircar et al. | 55/33 |
| 4,021,211 | 5/1977 | Turek et al. | 55/18 |
| 4,039,306 | 8/1977 | Taylor | 55/163 |
| 4,047,904 | 9/1977 | Worrall | 55/18 |
| 4,070,164 | 1/1978 | Miwa et al. | 55/26 |
| 4,127,395 | 11/1978 | McKey et al. | 55/20 |
| 4,140,495 | 2/1979 | Pietruszewski | 55/21 |
| 4,168,149 | 9/1979 | Armond et al. | 55/21 |
| 4,194,890 | 3/1980 | McCombs et al. | 55/18 |
| 4,197,095 | 4/1980 | White et al. | 55/20 |
| 4,205,967 | 6/1980 | Sandman et al. | 55/21 |
| 4,234,322 | 11/1980 | DeMeyer et al. | 55/18 |
| 4,247,311 | 1/1981 | Seibert et al. | 55/162 |
| 4,263,018 | 4/1981 | McCombs et al. | 55/18 |
| 4,322,223 | 3/1982 | Christel, Jr. | 55/18 |
| 4,323,370 | 4/1982 | Leitgeb | 55/18 |

Primary Examiner—Robert H. Spitzer
Attorney, Agent, or Firm—James C. Simmons; E. Eugene Innis

[57] ABSTRACT

A system and method of controlling a vacuum swing adsorption process. During an adsorption step, the percent composition of the gas being processed is sensed as it is introduced into at least one train of beds which comprises a pretreatment bed and an air fractionation bed. The control system terminates the adsorption step when a predetermined high level oxygen composition is detected. During a rinse step the percent composition of the high purity nitrogen in the train is sensed. The control system terminates the rinse step when a predetermined low level oxygen composition is detected. During an evacuation step, the level of pressure in the train is sensed and predetermined subatmospheric pressure levels are detected for terminating evacuation in first, the air fractionation bed, and second, the pretreatment bed. During a pressurization step, the pressure level in the pretreatment bed is sensed and the control system terminates the pressurization in the train when a predetermined pressure level is detected in the pretreatment bed.

18 Claims, 11 Drawing Figures

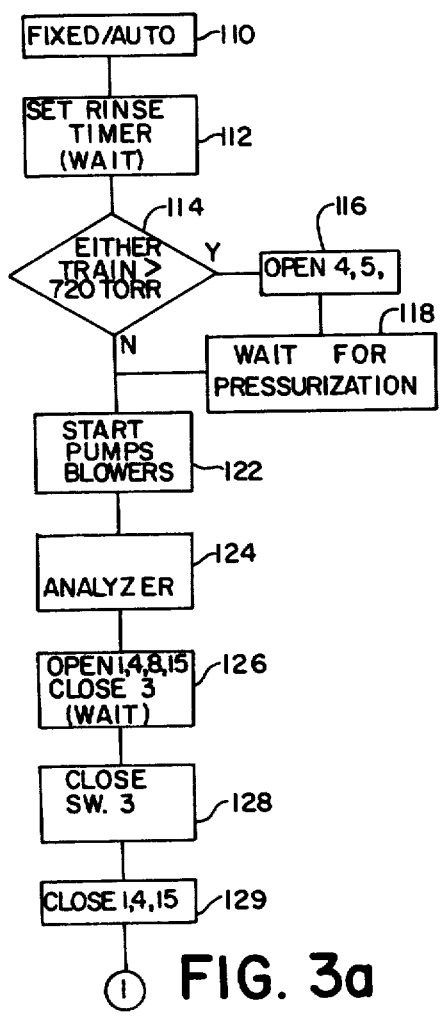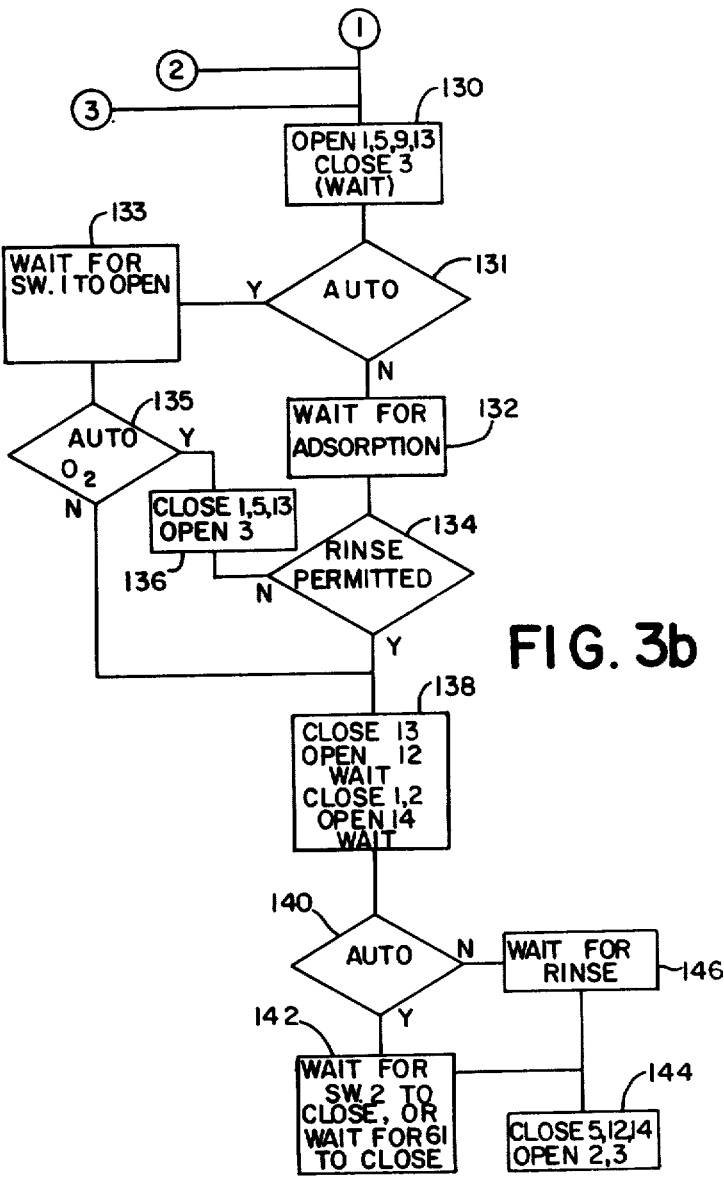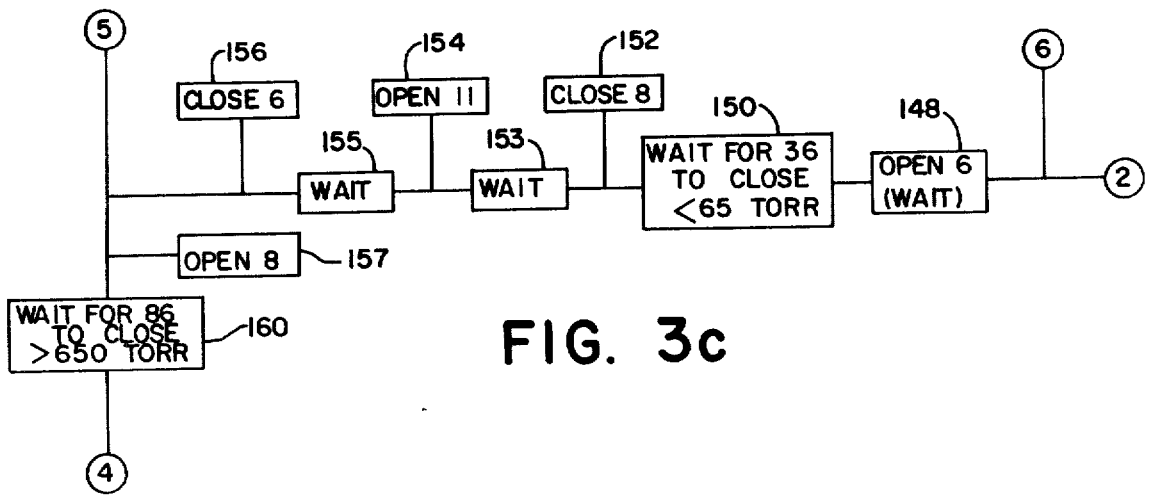
FIG. 3a
FIG. 3b
FIG. 3c

CONTROL SYSTEM AND METHOD FOR AIR FRACTIONATION BY VACUUM SWING ADSORPTION

BACKGROUND OF THE INVENTION

1. Field of the Invention

The present invention relates to fractionation of air by selective adsorption and is particularly concerned with controlling a vacuum swing system that recovers from air separate product fractions including a high purity nitrogen product and an oxygen-enriched gas fraction.

2. Background Art

Many systems are described in the prior art for automatically controlling various steps in the separation of gases by preferential adsorption. Typical among these are the following patents that generally disclose the use of selected gas separation process parameters for controlling the cyclic operation of predetermined process steps.

The control system disclosed in U.S. Pat. No. 3,703,068 monitors the pressure in the adsorbent beds during repressurization and terminates repressurization of the beds when a predetermined pressure level is obtained. The control system also initiates the appropriate cycle changes in other sorbent beds. Control of gas adsorption is obtained by altering the flow rate of the gas in order to provide the proper volume of feed gas that the sorbent bed is capable of handling during the adsorption step. U.S. Pat. No. 4,047,904 shows switching of the adsorption step to the desorption step when the control system detects that the composition of the exhaust gas at the effluent end of the sorbent bed exceeds a predetermined level. The flow rate of the gas remains constant. In U.S. Pat. No. 4,247,311, a microprocessor is used to monitor the adsorption column pressure during regeneration for the purpose of controlling the amount of gas used during the purge step. Disclosed in U.S. Pat. No. 4,194,890 is a pressure swing adsorption process where the composition of the effluent gas from one of the first adsorption beds is monitored to determine when adsorption has ended in that bed. The control system terminates the adsorption step based on the percent composition of the effluent gas from the adsorption column and initiates the next step of the process. U.S. Pat. No. 4,168,149 discloses a control system that senses the level of a vacuum in an adsorption bed that is being regenerated and switches the process to the next step when a predetermined level of vacuum is reached.

In the present invention, there is provided automatic control of the air fractionation system disclosed in U.S. Pat. No. 4,013,429 which is incorporated herein by reference. This patent discloses a vacuum swing adsorption process comprising the following steps:

(1) an adsorption step during which atmospheric air is introduced into at least one train of beds comprising in sequence, a pretreatment bed and an air fractionation bed that provides selective adsorption for separate recovery of high purity nitrogen and oxygen-enriched product gas;

(2) a rinse step during which the train of beds becomes saturated with the high purity nitrogen;

(3) an evacuation step during which nitrogen-enriched gas is withdrawn from the train of beds;

(4) a pressurization step during which the pressure in the train of beds is raised to near ambient pressure level; and (5) the sequence is repeated starting with step one.

The above described prior art is limited in that it does not show how to control the operation of such a vacuum swing adsorption system based on the use of both enriched product gas composition and column pressure while maintaining flow rate substantially constant and varying cycle time.

Accordingly, an object of the present invention is a control system and method for a vacuum swing adsorption system that detects the percent concentration of a product gas and column pressure at predetermined steps of the process for the purpose of controlling each step of the process.

Another object of this invention is to keep gas flow rate substantially constant while controlling the time duration of the steps of adsorption and rinse.

SUMMARY OF THE INVENTION

A system and method for controlling a vacuum swing adsorption system in which the percent composition of atmospheric air is sensed as it passes through a train of beds during the adsorption step. When a predetermined high level oxygen composition is detected, the adsorption step is terminated. During the rinse step, the percent composition of high purity nitrogen is sensed and when a predetermined low level oxygen composition is detected, the rinse step is terminated. During the evacuation step, the level of pressure in the train is sensed. When predetermined subatmospheric pressure levels are detected, the evacuation is terminated first, in the fractionation bed, and second, in the pretreatment bed.

During the pressurization step in the pretreatment bed, the pressure level is sensed either directly or by time. When a predetermined pressure level is detected in the pretreatment bed, the pressurization step in the train is terminated, and the sequence of steps is repeated.

BRIEF DESCRIPTION OF THE DRAWINGS

FIGS. 3a-3e taken together illustrate a flow chart of the floating time format system that controls each of the process steps of the computer controlled gas separation system of FIG. 2.

DETAILED DESCRIPTION OF THE INVENTION

Figure 2:
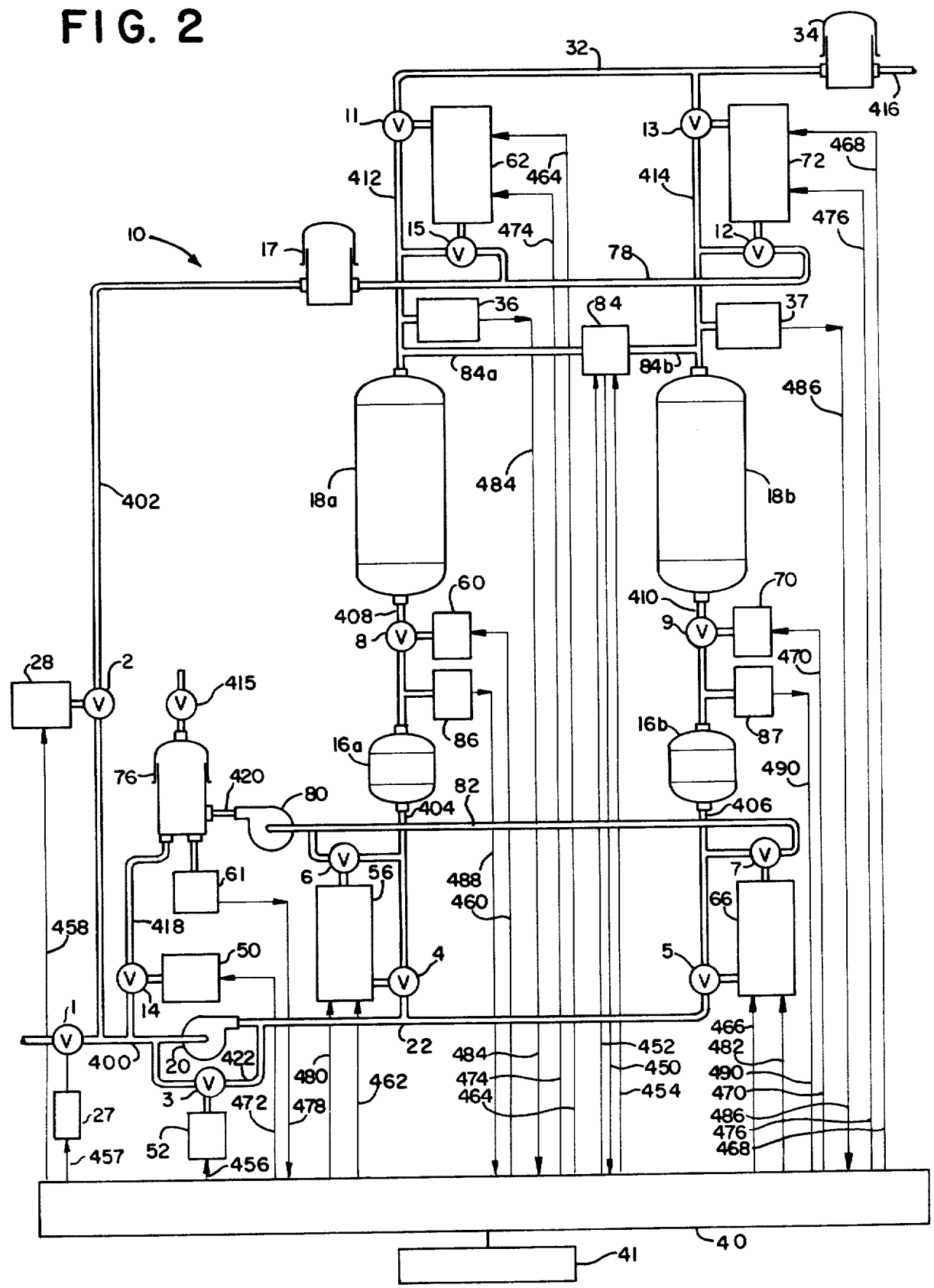
FIG. 2 shows a flow diagram of a control system for a gas separation system in accordance with the present invention.

Referring to FIG. 2, there is shown a control system for an air separation system 10 by vacuum swing adsorption disclosed in U.S. Pat. No. 4,013,429. System 10 includes two parallel adsorption columns or beds 18a and 18b, two pretreatment beds 16a and 16b upstream of sorption columns 18a and 18b and, forming in conjunction with said sorption columns, a first and second train of columns, respectively. System 10 further includes storage tank 17 for an air like gas, nitrogen product storage tank 76, oxygen product storage tank 34, air blower 20, vacuum pump 80, programmable controller 40, controller peripherals 41, and various types of valve and switch interfaces.

Figure 1A:
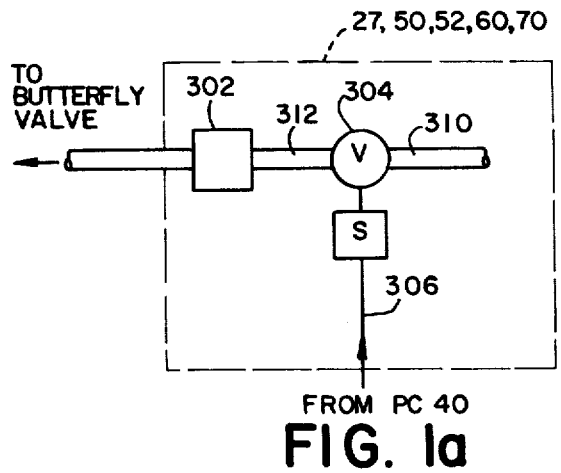
FIGS. 1a-1e show flow diagrams of the valves and switches that interface a programmable controller with the air separation system of FIG. 2.
Figure 1B:
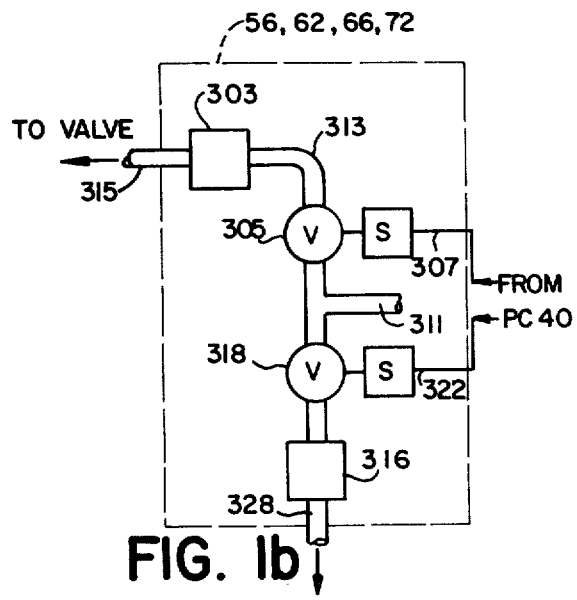
Figure 1C:
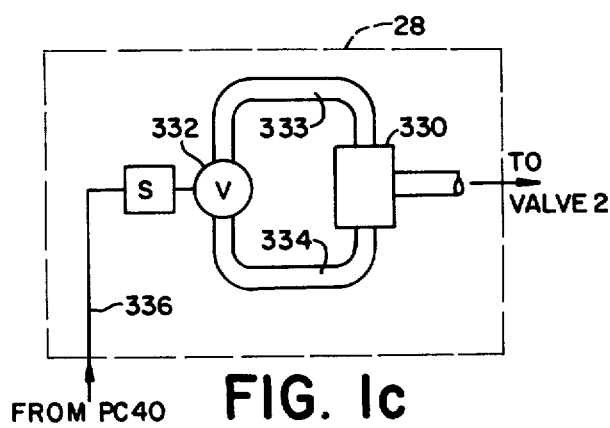

FIGS. 1a-1c show types of valve control interfacing between system 10 and programmable controller 40. Generally, valve control interfacing provides for the opening and closing of process valves upon command from and as a result of process conditions recognized by the programmable controller (PC) 40. The overall features and the execution of programmed tasks of PC 40 are described in an article by Ronald K. Jurgen, entitled "Industry's Work Horse Gets Smarter", *IEEE Spectrum*, pages 34–38, February, 1982, and which is incorporated herein by reference. PC 40 may be a MODICON Model 484 which is manufactured by Gould, Inc., Modicon Division, Andover, Mass., 01810.

Valve Interfaces

Referring to FIG. 1a, valve control interface, type A, is shown which includes a pneumatic actuator 302 and a solenoid control valve 304 both connected between a butterfly valve and PC 40. The solenoid actuator of valve 304 receives command signals from PC 40 on line 306. Valve 304 is also connected to an air supply by air supply line 310. When valve 304 is open, air is directed to pneumatic actuator 302 along pneumatic line 312 to either open or close the butterfly valve depending upon whether the butterfly valve is a fail-open or fail-closed valve.

Referring to FIG. 1b, two type A interfaces have been modified and combined into valve control interface, type B. Type B interface includes two pneumatic actuators 303 and 316, two solenoid control valves 305 and 318 all connected between the butterfly valves and PC 40. In the manner previously described for type A interface, the solenoid actuators of valves 305 and 318 receive command signals at predetermined times from PC 40 on lines 307 and 322, respectively. Each actuator is directed to open or close valves 305 and 318 by transmitting open and close signals. Both valves, 305, 318, are connected to a common air supply by air supply line 311. When valves 305 and 318 are open, air is directed to pneumatic actuators 303 and 316 along pneumatic lines 313 and 326, respectively, to either open or close the butterfly valves via lines 315 and 328.

Referring now to FIG. 1c, type C valve control interface 28 (FIG. 2) is shown which includes a double acting actuator 330 and a switching valve 332 both connected between a butterfly valve 2 and PC 40. The solenoid actuator of valve 332 receives command signals from controller 40 on line 336. The actuator is directed to open or close valve 332 by transmitting open or close signals. When valve 332 is open, air is directed to double acting actuator 330 along pneumatic lines 333 and 334 for controlling the opening and closing of a butterfly valve 2.

Switch Interfaces

Figure 1D:
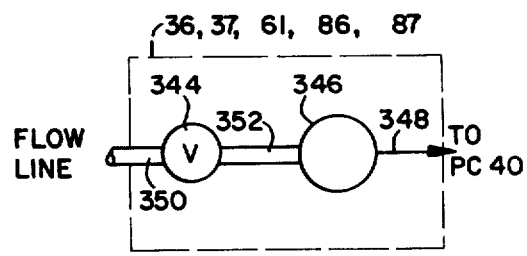
Figure 1E:
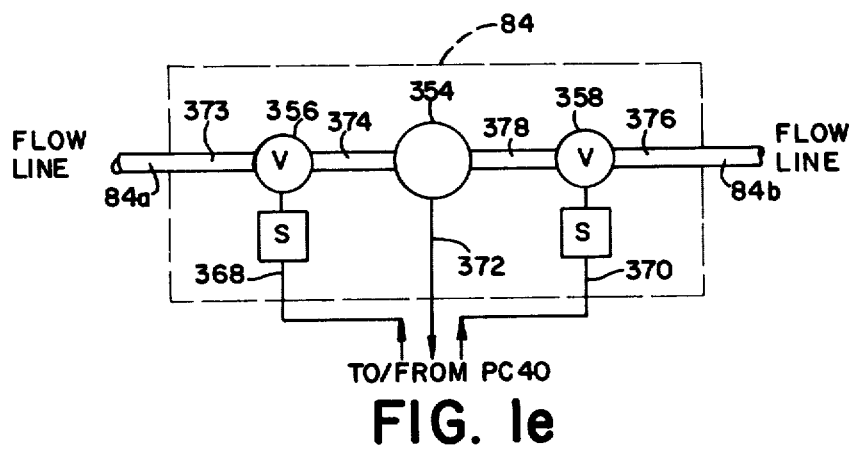

FIGS. 1d and 1e show switch interfacings which provide signals to PC 40 representing conditions at predetermined points in the process flow stream. These signals enable the controller to execute the next program task in sequential fashion to permit the process to continue.

Referring to FIG. 1d, switch interface type D includes lock-out valve 344 and pressure or gas concentration switch 346 both connected between a predetermined point in the process flow line and PC 40. Switch 346 opens or closes to indicate the completion of a step in the process depending upon the pressure or concentration of the gas at a predetermined point in a gas flow line. The switch senses these conditions via lines 350 and 352 and through lock-out valve 344. The PC receives a signal along line 348 from switch 346 that indicates the state of the process at the predetermined point in the process line as a function of switch position, i.e., either open or close. Switch position is a function of either gas pressure or gas purity in the line depending upon the switch used as defined in Table 1.

Referring to FIG. 1e, type E switch interface 84 (FIG. 2) includes oxygen analyzer 354, incorporating at least three switches (switches 1, 2, and 3, as defined in Table 1) and solenoid control valves 356 and 358 all connected between at least two process flow lines 84a, b and controller 40. Solenoid control valves 356 and 358 include solenoid actuators and gate valves. Controller 40 provides control signals to each solenoid actuator along lines 368 and 370, respectively, as a function of the signals provided from oxygen analyzer 354 to the controller along line 372. The signals to the PC provide an indication of the purity of the gas at predetermined points in process flow lines 84a, b. The gas purity is detected by oxygen analyzer 354 after passing through line 373, valve 356, and line 374 from process flow line 84a and through line 376, valve 358, and line 378 from the other process flow line 84b.

Table 1 specifically describes switch interfaces of types D and E in terms of the specific gas separation steps being performed or completed in a train of columns.

General Description of System 10

A general description of system 10 (FIG. 2) in terms of gas flow will now be provided. Ambient air to be fractionated is supplied to the process through a main air feed valve 1 along line 400 through blower 20 discharging in manifold 22 which is common to both trains of columns. The flow of ambient air is controlled by the opening and closing of valve 1 by PC 40. PC 40 provides control signals along line 457 to type A valve interface 27 for controlling its solenoid actuated valve to open or close valve 1. Feed air like gas, which was previously stored in storage tank 17, is also supplied to the blower along line 402 and, subsequently, discharges in manifold 22. The flow of air like gas from tank 17 is controlled by the opening and closing of recycle valve 2 by PC 40. PC 40 provides control signals along line 2 to type C switching valve interface 28 for controlling its double actuating switch to open or close recycle valve 2. The air in manifold 22 which is to be fractionated is supplied to pretreatment bed 16a along line 404 or to pretreatment bed 16b along line 406. Table 2 sets forth the valves in terms of when they are open or closed as a function of the appropriate process step.

The air to be separated passes through pretreatment beds 16a and 16b and through lines 408 and 410 to main sorption columns 18a and 18b, respectively, at predetermined times under the control of PC 40. Oxygen enriched gas is the effluent gas from each main sorption column 18a and 18b during the adsorption step and is fed through line 32 to oxygen product storage tank 34 along lines 412 and 414, respectively. The output of oxygen product from tank 34 is provided along line 416.

During the rinse step, nitrogen is drawn out of nitrogen product storage tank 76 along nitrogen rinse line 418 by blower 20 and is provided to either the first or second train by way of their pretreatment beds via lines 404 or 406. The air like effluent along either line 412 or 414 from the main sorption columns 18a or 18b is supplied to storage tank 17 along common nitrogen discharge manifold 78. The nitrogen product gas may otherwise be removed from tank 76 by way of valve 415.

During the evacuation step, vacuum pump 80 creates substantially a vacuum in either the first or second train of columns which provides for nitrogen to flow out of either the first train through line 404 or the second train through line 406, through common nitrogen supply manifold 82, through pump 80 and to storage tank 76 through line 420.

The air through blower 20 may, at predetermined times, be recycled through line 422 when, for example, the air separation or rinsing steps are not being performed. Air blower recycle valve 3 is controlled by PC 40 by way of type A interface 52 using line 456.

Detailed Description of System 10

The steps of gas separation performed by system 10 and controlled by controller 40 will now generally be described with emphasis on the opening and closing of the process valves. Regardless of how many trains are combined in parallel, each train will, at a predetermined time, undergo gas adsorption. Adsorption occurs when ambient air which is near ambient pressure and temperature, flows through at least one pressurized main sorbent column in a train. The main column contains a suitable sorbent material which selectively adsorbs nitrogen from air such as type A zeolite, type X zeolite or synthetic mordenite, for selectively retaining a particular constituent of air. Air is pretreated before being passed through the sorbent bed, for the removal of impurities such as water and carbon dioxide. Such pretreatment is described in U.S. Pat. No. 4,264,340 which is incorporated herein by reference.

An effluent stream of an oxygen enriched product gas is withdrawn from the exit end of the main adsorbent column and subsequently removed for use in another process or for saturation of the main and pretreatment adsorbent bed during a later step of the process, i.e., the repressurization step. The adsorption step is continued until a predetermined pressure is obtained in the column or until a predetermined level of purity of the enriched product gas is provided at the effluent end of the column.

For adsorption to occur in the first train, process valves 1, 4, 8, and 11 must be opened. Valve 8 is opened by type A interface 60 which is controlled by PC 40 by way of line 460. Process valves 11 and 4 are opened by two type B interfaces 62 and 56, respectively. PC 40 transmits signals along control lines 462 and 464 to actuate valves in interfaces 56, 62.

Control of process valve openings for adsorption to occur in the second train is performed in substantially the same manner as described above. Specifically, for adsorption to occur in the second train, valves 1, 5, 9, and 13 must be opened. The PC 40 transmits signals along control lines 466 and 468 to type B interfaces 66 and 72 for opening process valves 5 and 13 respectively. Also, and substantially simultaneously, the PC 40 transmits signals along control line 470 to type A interface 70 for opening process valve 9.

Adsorption is terminated in either train upon closure of high oxygen switch 1 (Table 1) in an oxygen analyzer, represented by type E interface 84. Specifically, adsorption ends in the first train when oxygen analyzer interface 84 detects a preset high oxygen purity along analyzer input port 84a from process line 412. Similarly, adsorption ends in the second train when the analyzer detects preset high oxygen purity along analyzer input port 84b from process line 414. PC 40 controls the analyzer operation upon receiving signals along control line 450, representative of oxygen purity, indicating that switch 1 had closed and that adsorption had ended. The controller, in turn, provides control signals along lines 452 and 454 for opening or closing the appropriate gate valve in analyzer interface 84 depending upon which train has just completed adsorption.

The process step that follows adsorption in either train in FIG. 2 is nitrogen gas rinse. Air does not flow through the train undergoing the rinse step. Instead, nitrogen that had previously been stored for the purpose of rinsing the sorbent bed is made to flow through the pretreatment and main sorption column of the train being rinsed. Rinse effluent produced during the rinsing of the sorption column is withdrawn and stored for subsequent use as part of the feed gas in a later adsorption step. The rinse step continues until the adsorption columns become substantially saturated with a high purity nitrogen.

For rinse to occur in the first train, process valves 14, 4, 8, and 15 are opened, and process valves 1 and 11 are closed. PC 40 transmits signals along control line 472 to the solenoid actuated valve of type A interface 50 for opening process valve 14. Process valves 4 and 8 remain open from the first train adsorption step. The controller transmits signals along control line 474 to actuated valves in interface 62 for opening process valve 15. The controller also transmits control signals along control line 464 to interface 62 for closing process valve 11.

Control of the opening and closing of process valves to implement the rinse step in the second train is performed in substantially the same way. Process valves 14, 5, 9, and 12 are opened for rinse to occur in the second train, and process valves 1, 13 are closed. Valve 14 opens in the manner previously described. Valves 5 and 9 remain open from the second train adsorption step. PC 40 transmits signals along control line 476 to a predetermined solenoid actuated valve in interface 72 for opening process valve 12. The controller also transmits signals along control line 468 to the other solenoid actuated valve in interface 72 for closing process valve 13.

The rinse step is terminated for either train when low oxygen purity is detected in oxygen analyzer interface 84. Specifically, low oxygen switch 2 closes indicating the end of the rinse step, and a signal is transmitted to controller 40. The PC control of the oxygen analyzer was previously described. As an alternative for ending the rinse step in either train, the low nitrogen switch in type D interface 61 closes when the nitrogen purity in nitrogen storage tank 76 is low. The controller receives signals along control line 478 indicating the closure of the low nitrogen switch and provides for the subsequent termination of the rinse step in either the first or the second train of columns.

The step following the rinse step in either train of columns is the desorption or evacuation step. The nitrogen flow has been discontinued and the main adsorption column of the rinsed train will now be evacuated by reducing the pressure in the column to a predetermined level. A stream of nitrogen rich gas is withdrawn from the inlet end of the train and is, in part, stored for use in a subsequent rinse step for either column, and, in part, removed as a product gas. If more than one column is used in series, such as a feed gas pretreatment column and a main adsorber-separation column, the evacuation step requires two phases of operation. In the first phase, evacuation is completed in the main sorption column when the pressure in that column is reduced to a predetermined level. Specifically, the operative range of pressure is 40 to 200 Torr and the preferred range is 60 to 110 Torr. In the second phase, evacuation is completed in the pretreatment column, subsequent to completion in the main column, when the pressure in the pretreatment column is reduced to at least 10 Torr lower than in the main column. Specifically, the preferred range of pressure is 10–100 Torr and the most preferred range is 20–70 Torr.

For evacuation to occur in the first train, process valves 6 and 8 are opened, process valves 4 and 15 are closed, and valve 11 remains closed. Process valve 6 is opened and process valve 4 is closed by interface 56. The controller transmits control signals along control line 462 to a predetermined solenoid actuated control valve of interface 56 for closing process valve 4 and along control line 480 to the other solenoid controlled valve for opening process valve 6. Process valve 8 remains opened and process valve 11 remains closed after the rinse step and for at least the first phase of the evacuation step. The controller provides control signals along line 474 to a predetermined solenoid actuated valve of interface 62 for closing process valve 15.

Evacuation in the second train of columns is controlled in substantially the same way. For evacuation of the second train, process valves 7 and 9 are opened. Process valves 5 and 12 are closed and valve 13 remains closed. PC 40 transmits control signals along line 482 to a valve in interface 66 for opening process valve 7. Process valve 9 remains open and process valve 13 remains closed after the rinse step and during at least the first phase of the evacuation step. Controller 40 transmits control signals along line 466 to a valve in interface 66 to close valve 5. Similarly, the controller transmits control signals along line 476 to close process valve 12.

Evacuation starts with the column and continues in the serially connected pretreatment column as each train undergoes evacuation (desorption). Evacuation ends in the main sorption column but continues in the pretreatment column. The main sorption column repressurizes while the pressure continues to decrease in the pretreatment column.

With regard to the first train, type D switch interface 36 (the first train vacuum switch) closes when the vacuum produced in bed 18a reaches a predetermined level. The closing of the vacuum switch at interface 36 produces a signal along line 484 to PC 40 indicating that the evacuation pressure has obtained its predetermined level in the first train main sorption column. Controller 40 then transmits control signals along line 460 to interface 60 to close process valve 8 and control signals along line 464 to interface 62 to open process valve 11. As a result, evacuation continues for a predetermined amount of time in pretreatment bed 16a while pressurization occurs in main sorption bed 18a. This timing of pretreatment bed evacuation is effected sensing pressure since pressure in bed 16a is related to time. Pressurization occurs because column 18a is in direct communication with oxygen storage tank 34 which is at or near ambient pressure level.

In the second train, type D switch interface 37, which is the second train vacuum switch, closes when the vacuum produced in column 18b reaches a predetermined level. The closing of the vacuum switch of interface 37 produces a signal along line 486 to controller 40 indicating that the evacuation pressure has reached its predetermined level in the main sorption bed of the second train. Controller 40 then transmits a control signal along line 470 to interface 70 to close process valve 9 and a control signal along line 468 to interface 72 to open process valve 13. As a result, evacuation continues for a predetermined amount of time in pretreatment bed 16b while pressurization occurs in the main sorption bed 18b. This timing is effected sensing pressure as previously discussed. Pressurization occurs because column 18b is in direct communication with oxygen storage tank 34 which is at or near ambient pressure level.

The final step of the gas separation process before gas adsorption begins again is the pressurization step which begins in the main sorption column of each train before the evacuation step of the train is completed. Oxygen rich gas is withdrawn and retained from the main sorption column, during the adsorption step, is provided to the main sorption column at the end of the evacuation of that column until the pressure in the main column is raised to a predetermined level. As more than one column is used in the system, repressurization in each column may occur in a predetermined, sequential order (phases). A main sorption column is repressurized to near ambient pressure before a pretreatment column begins repressurization. Repressurization will end in each column when the pressure reaches a predetermined level, i.e., near ambient pressure level.

Once pressurization occurs in the main sorption bed 18a, controller 40 transmits a control signal along line 460 to open process valve 8 to allow pressurization to occur in pretreatment bed 16a over a predetermined period of time. At this time valve 4 is closed. At the end of pressurization of the first train, type D switch interface 86 closes when a pressure level is obtained close to or equal to ambient pressure and preferably at least 650 Torr. The closing of the pressurization switch in interface 86 produces a control signal on line 488 to controller 40 which in turn provides control signals along line 462 to open process valve 4. Similarly, when the second train is pressurized, type D switch interface 87, which is second train pressurization switch, closes transmitting a signal along line 490 to the controller. The switch closes when the pressure level is close to or equal to ambient pressure and preferably at least 650 Torr. The controller provides control signals along lines 466 for opening process valve 5. In each case, the trains are prepared to begin the adsorption step since the controller has provided for the appropriate process valves to be open or closed as previously described.

The steps of the process are now repeated to perform, sequentially, but out of phase with respect to each train, the sorption step, the rinse step, the evacuation (desorption or purge) step and the repressurization (regeneration) step.

As previously described, gas fractionation is performed by vacuum swing adsorption. A key control parameter is the effect of the environmental temperature fluctuations on the process since the phenomenon of adsorption-desorption is very temperature sensitive. One preferred mode of operating the process is to hold gas flow rates constant during the adsorption, the nitrogen rinse and the pressurization steps and to maintain a constant vacuum pump speed during the evacuation step. However, when the gas flow rate is held constant, the process cycle time varies (increases or decreases) as the actual ambient temperature changes (decreases or increases from the design temperature).

Specifically, since the process is designed to meet the rated production capacity at an optimum design temperature, as the temperature falls during process operation, the adsorption capacities increase. As the adsorption capacities increase, larger quantities of gas have to be supplied to or removed from the process during the adsorption, the nitrogen rinse, the evacuation, and the pressurization steps. However, for this preferred embodiment of the invention, the gas flow rates are maintained constant during adsorption, nitrogen rinse, and pressurization steps, and the pumping speed is maintained constant during evacuation. In order to maintain optimal gas separation during changes in adsorption capacity, the time duration for each step of the process is a function of the variation in temperature of the process. For example, the time duration for each step of the process increases or decreases as the temperature of the process decreases or increases.

A floating time format control system, to be described with respect to FIGS. 3a-e, is used to achieve the desired control of the steps of the gas fractionation process. The control system generally includes the monitoring of the different steps of the process by sensing the changes in predetermined process parameters such as gas pressure and composition at various points in the process stream. The system then automatically initiates the next sequential step in the process by opening or closing appropriate valves for controlling the flow direction of the gas through the process. Constraints placed on the operation of the process include having the control system continuously operate vacuum pump 80 and having the time duration of the evacuation step at least equal to the combined durations of the adsorption, the nitrogen rinse, and the pressurization steps. In addition to the constraints, a time lag may be allowed between the execution of the consecutive adsorption-nitrogen rinse steps occurring in one train of columns and the adsorption-nitrogen rinse steps occurring in a second train of columns. Blower 20 is allowed to idle during this time lag without any significant power penalty.

Additional properties of the gas separation process that are incorporated into the format of the floating time control system include a detectable change in the gas purity and gas flow rate at the effluent end of the main sorption columns at the end of the adsorption step and at the end of the nitrogen rinse step. Furthermore, the vacuum pump may be allowed to continue to evacuate the pretreatment column even after the lowest predetermined pressure level is obtained for the purpose of cleaning the column without consuming a significant amount of extra energy.

Continuously monitored gas compositions or purities and column pressures are used to provide representative signals to controller 40 for determining and controlling the time duration of each step of the process. The following is a discussion of the steps of the automatically controlled process occurring simultaneously but out of phase with one another in each of the trains of fractionation system 10 shown in FIG. 2. The process steps will now be described in terms of valve openings and closings as set forth in Tables 2 and 3 in response to pressures and gas purity at predetermined points in the process flow stream.

Floating Time Format Control Program - Flow Chart

Figure 3D:
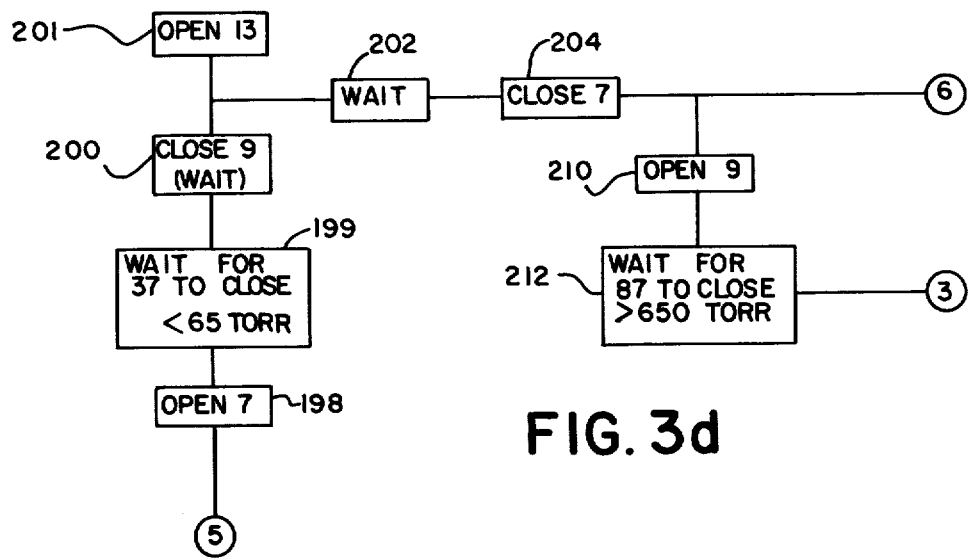

The floating time format control which is programmed in PC 40 for the gas fractionation system 10 is shown in FIGS. 3a-3e and will now be described. Referring to FIG. 3a, the process begins by selecting a fixed control format or an automatic control format at block 110. Thereafter, the rinse timer for nitrogen rinsing in either train is set and the system waits a predetermined amount of time at block 112. PC 40 receives signals from first and second train pressurization switches 36,37 for determining whether each train has completed pressurization to greater than 720 Torr at block 114. If both switches were still open, indicating that pressurization is not complete, feed valves 4, 5 to the first and second trains open at block 116 and the process waits at 118 for the columns of each train to be pressurized to greater than 720 Torr. Each vacuum switch, indicating the end of pressurization in each train, thereafter closes and all of the process pumps, compressors, and blowers are started at block 122. Feed air is recycled through valve 3 until adsorption begins. Oxygen analyzer 84 closes high oxygen switch 1, low oxygen switch 2, and opens low oxygen switch 3 at block 124. Switch 3 will close to signal the end of air purge during the start-up phase when nitrogen purity is greater than 70%.

Valves 1,4, 15 and 8 are opened while valve 3 is closed. The process now waits at block 126 for the appropriate valves to open and close and for low oxygen switch 3 to close at block 128. This signals the end of air purge when the purity of nitrogen gas at the effluent of the main sorption column of the first train of columns is greater than 70% nitrogen. Valves 1, 4 and 15 close at block 129. At bubble 1 of FIG. 3a, the start-up of the process is completed and two events, as shown in FIGS. 3b-c, occur simultaneously. Specifically, the second train adsorption followed by nitrogen rinsing occurs simultaneously with the first train evacuation followed by repressurization. Second train adsorption/rinsing is shown in FIG. 3b and first train evacuation/repressurization is shown in FIG. 3c. FIG. 3b will be analyzed first.

From the end of the start-up of the process at bubble 1, the second train adsorption step begins when valves 1, 5, 9 and 13 open and valve 3 remains closed at block 130. Valve 13 vents the oxygen product gas to the common oxygen storage tank 34. PC 40 determines if the generator is in automatic mode at block 131. If the process is in automatic mode, the format control waits at block 133 for the high oxygen switch 1 in the oxygen analyzer 84 to close when oxygen purity is at a preset value in the range of 70–90% (preferred range) or nitrogen purity is in the range of 30–10%. Controller 40 then determines if the generator is in automatic oxygen mode at block 135. If it is not, the rinse step begins. However, if it is in automatic oxygen mode, the controller closes valves 1, 5 and 13 at block 136 while opening blower vent valve 3. If the system was not in automatic mode at block 131, controller 40 (also called "control system" herein) waits for adsorption to occur at block 132. After adsorption occurs, the control system determines if the rinse step is permitted at block 134. If the rinse step is not permitted, valves open and close at block 136 as described above. Otherwise, the rinse step is permitted to begin.

Nitrogen rinse of the second train begins when valve 13 closes and valve 12 opens. The control system waits for a predetermined period of time and then PC 40 closes valve 2 and opens valve 14 and closes valve 1. The control system again waits for a predetermined period of time for the appropriate valves to open and close at block 138.

If the system is not in automatic at 140, controller 40 waits for rinsing to occur at block 146. If the system is in automatic mode, controller 40 waits for low oxygen switch 2 (Table 1)to close when the purity of the gas at the effluent of the main sorption column of the second train is 15% oxygen or below (preferred range) or 85% nitrogen or above or until the low nitrogen switch in interface 61 closes to signal the end of the nitrogen rinse step for the second train at block 142. Once the rinse step is completed for the second train of columns, valves 5, 12 and 14 will close and valve 3 will open at block 144.

As previously described, the other event which occurs simultaneously with the events of FIG. 3b include the first train evacuation and repressurization as shown in FIG. 3c. From bubble 1 in FIG. 3b which indicates the end of the start-up procedure in FIG. 3a, the format control continues also to bubble 2 which is the start of the first train evacuation and subsequent repressurization steps. From bubble 2 in FIG. 3c, the first train evacuation begins when valve 6 is opened at block 148. The control system waits for this valve to open and then waits at block 150 for first train vacuum switch (interface 36) to close when the pressure in main sorption column 18a is less than a preset value, for example, 65 Torr. This signals the end of the first train evacuation step.

When the pressure becomes less than 65 Torr in the main sorption column of the first train, valve 8 closes at block 152. The controller waits for valve 8 to close at block 153 before opening product valve 11 at block 154 which allows the column 18a to repressurize since it is now in communication with tank 34. The controller waits at block 155 until column 18a repressurizes while, at the same time, evacuation continues in the pretreatment column 16a. Evacuation now ends in bed 16a when valve 6 at block 156 closes. At this point, column 18a has been repressurized while pretreatment column 16a has been evacuated. Valve 8 now opens at block 157 to allow for repressurization of pretreatment bed 16a. The first train pressurization switch in interface 86 closes to signal the end of the first train repressurization when the pressure exceeds 650 Torr at block 160.

Just prior to the beginning of the repressurization of the pretreatment column 16a at block 157, the simultaneous events of the second train evacuation and subsequent repressurization occur beginning at bubble 5 in FIG. 3c. In other words, the second train evacuation and subsequent repressurization occurs substantially simultaneously with the repressurization of the first train pretreatment column and subsequent first train adsorption and nitrogen rinse steps beginning at bubble 4. The first train adsorption and rinsing occur after the first train pressurization switch closes at block 160. Adsorption and subsequent rinsing of the first train will be discussed first beginning at bubble 4 in Fig. 3e.

Figure 3E:
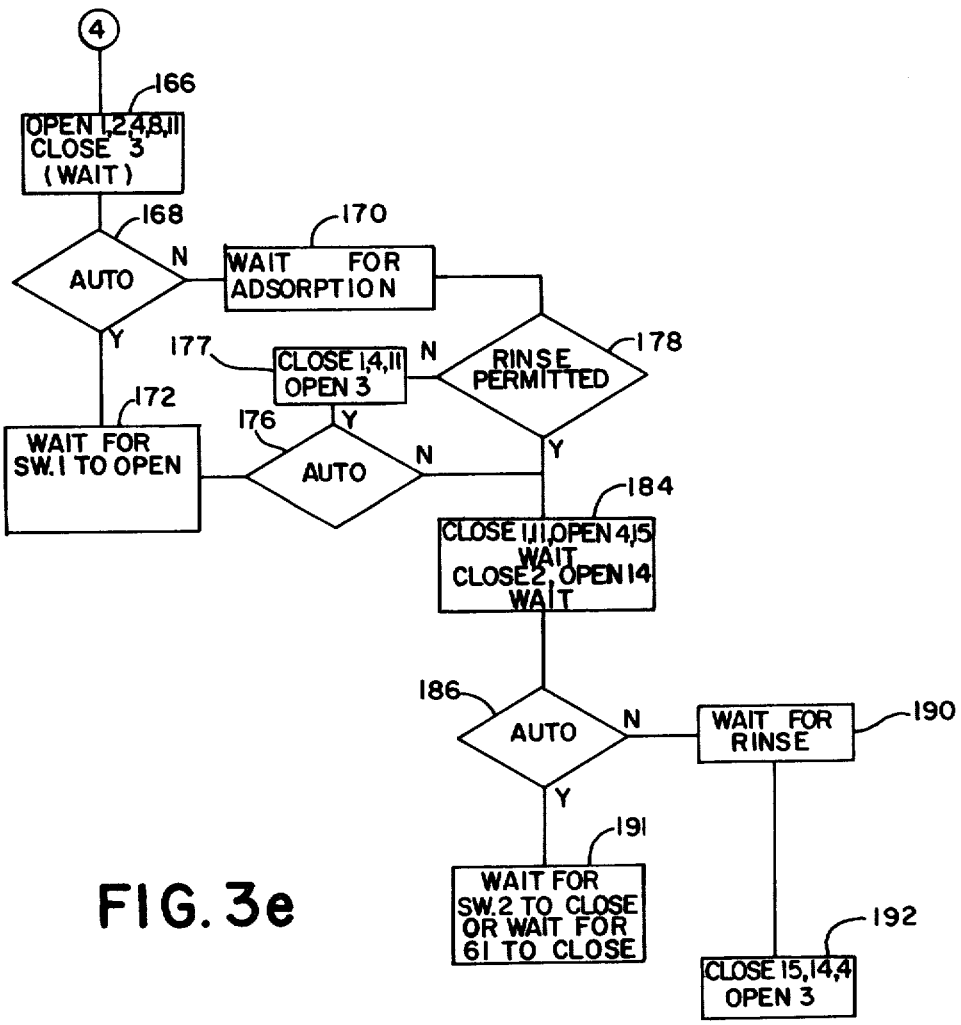

As shown in FIG. 3e, adsorption in the first train begins when valves 1, 2, 4, 8 and 11 open and valve 3 closes at block 166. The control system waits a predetermined period of time for those valves to open and close before determining whether the system is set to its automatic mode at block 168. If the system is not in automatic mode, the control system waits a predetermined period of time for adsorption to occur in the first train at block 170 before determining if the rinse step can begin at block 178. If in automatic mode at block 168, the controller waits for switch 1 to open at block 172 when oxygen purity is 70% or above (preferred range) or nitrogen purity is 30% or lower.

The control system determines if the automatic oxygen mode is set at block 176. If the system is in the automatic oxygen mode or if, after waiting for adsorption at block 170, rinse is not permitted at block 178 then valves 1, 4 and 11 close while valve 3 opens at block 177. If, at block 176, the system is not in automatic oxygen mode and if, at block 178, the rinse step is permitted, nitrogen rinsing will begin in the first train. The columns of the first train start to undergo rinsing when valves 1 and 11 close and valves 4 and 15 open at block 184.

Control system 10 now waits for air blower 20 to provide nitrogen gas from storage tank 76 to the first train. Thereafter, valve 2 closes while valve 14 opens. The control system now waits for a predetermined period of time before determining if the system is set to automatic mode at block 186. If, at block 186, the system is not in the automatic mode, the control system waits for a predetermined time period at block 190 for the nitrogen gas to start to blow through the first train of columns in order to complete the rinse step. If in automatic mode, the controller waits for switch 2 of the oxygen analyzer 84 to close when oxygen purity is 15% or less (preferred range) or nitrogen purity is 85% or above or until the low nitrogen switch closes at block 191. In either case, when rinsing is completed in the first train of columns, valves 4, 14, and 15, close while valve 3 opens at block 192. This completes the first train adsorption and rinse steps which occur simultaneously with the second train evacuation and repressurization steps. The steps of evacuation and repressurization for the second train of columns are shown in FIG. 3d and will now be discussed.

Specifically, the evacuation of the second train of columns begins while the pretreatment column 16a of the first train is repressurizing. The evacuation of the second train continues during the rinse phase of the first train of columns. Both evacuation in one train and rinse in the other occur simultaneously. FIG. 3d shows the start of the evacuation step from FIG. 3c for the second train at bubble 5. Evacuation begins in the second train when valve 7 opens at block 198. The control system then waits a predetermined period of time for valve 7 to open and then waits for the second train vacuum switch in interface 37 to close when the pressure in the main column 18b drops below, for example, 65 Torr at block 199. Evacuation is now occurring in the second train main sorption and pretreatment columns. PC 40 now closes valve 9 at block 200 to allow for the main column 18b to repressurize and to allow evacuation to continue in pretreatment column 16b. Valve 13 opens at block 201 to provide for repressurization of column 18b. The control system waits at block 202 while column 18b becomes repressurized. During this time, pretreatment column 16b is completely evacuated before valve 7 closes at block 204. Thereafter, valve 9 opens to allow for the pretreatment column 16b to repressurize at block 210. However, before the valve 9 opens, the control system at bubble 6 provides for the beginning of the evacuation step in the first train as shown in FIG. 3c.

In other words, while the pretreatment column of the second train is undergoing repressurization, the first train now begins the evacuation step. Pretreatment column 16b is completely repressurized when second train pressurization switch, in interface 87, closes after the pressure in the pretreatment column reaches and exceeds 650 Torr at block 212. Since the second train has now completely repressurized and since the first train has now begun the evacuation step in preparation for first train repressurization, the control system proceeds at bubble 3 second train adsorption at block 130 followed by each process step in sequence.

The sequence of process steps is now automatically repeated as previously described on a substantially continuous basis thereby allowing the gas separation steps in each train to be controlled substantially out of phase with respect to each other. The entire floating format control sequence is executed by programmable controller 40 which interfaces with operators by peripheral devices 41 and which receives signals from switches which are opened and closed in response to signals from transducers positioned at predetermined points throughout the process. The transducers respond to the level of gas purity and gas pressures at predetermined points throughout the process. Controller 40, as a function of gas purity and pressure, produces signals for controlling the opening and closing of appropriate process valves to allow each process step to continue in a predetermined automatic sequence.

TABLE 1

| | Description | Referenced As |
|---|---|---|
| Oxygen Analyzer 354 [Type E - FIG. 1e] | | |
| Switch 1 | High $O_2$ Purity Switch Closes To Signal End of Adsorption | High $O_2$ Switch 1 |
| Switch 2 | Low $O_2$ Purity Switch Closes To Signal End of $N_2$ Rinse | Low $O_2$ Switch 2 |
| Switch 3 | Low $O_2$ Purity Switch Closes To Signal End of Air Purge During Start-up | Low $O_2$ Switch 3 |
| Switch 346 In Type D Interface [FIG. 1d] | | |
| Interface 61 | Low $N_2$ Switch Closes to Signal End of $N_2$ Rinse | Low $N_2$ Switch |
| Interface 36 | Vacuum Switch Closes to Signal End of First Train Evacuation | First Train Vacuum Switch |
| Interface 37 | Vacuum Switch Closes To Signal End of Second Train Evacuation | Second Train Vacuum Switch |
| Interface 86 | Vacuum Switch Closes To Signal End of First Train Repressurization | First Train Pressurization Switch |
| Interface 87 | Vacuum Switch Closes to Signal End of Second Train Repressurization | Second Train Pressurization Switch |

TABLE 2

| Valve | Description | When Opened | When Closed | Referenced As |
|---|---|---|---|---|
| 1 | Air feed valve | During Adsorption Only | All Other Times | Air Feed Valve |
| 2 | Recycle Valve for Tank 17 | During Adsorption In Either Train | All Other Times | Recycle Valve |
| 3 | Air Blower Recycle Valve | During Evacuation of One Train and Pressurization of the Pretreatment Column in the Other Train | During Adsorption and $N_2$ Rinse of Either Train | Blower Vent Valve |
| 4 | Air Feed Valve to First Train | During Adsorption or $N_2$ Rinse of First Train | All Other Times | First Air Feed Valve |
| 5 | Air Feed Valve to Second Train | During Adsorption or $N_2$ Rinse of Second Train | All Other Times | Second Air Feed Valve |
| 6 | Evacuation Valve for First Train | During Evacuation of First Train | All Other Times | First Vacuum Valve |
| 7 | Evacuation Valve for Second Train | During Evacuation of Second Train | All Other Times | Second Vacuum Valve |
| 8 | Valve Between 16a and 18a | All Other Times | During Repressurization of 18a and Continued Evacuation in 16a | $M_1/P_1$ Valve |
| 9 | Valve Between 16b and 18b | All Other Times | During Repressurization of 18b and Continued Evacuation in 16b | $M_2/P_2$ Valve |
| 15 | First Train Vent Valve | During $N_2$ Rinse of First Train | All Other Times | First Vent Valve |
| 11 | First Train $O_2$ Product Valve to $O_2$ Tank | During Repressurization and Adsorption in First Train | All Other Times | First $O_2$ Product Valve |
| 12 | Second Train Vent Valve | During $N_2$ Rinse of Second Train | All Other Times | Second Vent Valve |
| 13 | Second Train $O_2$ Product Valve To $O_2$ Tank | During Repressurization and Adsorption in Second Train | All Other Times | Second $O_2$ Product Valve |
| 14 | $N_2$ Rinse Line Valve Between $N_2$ Tank and Air Blower | During $N_2$ Rinse of Either Train | All Other Times | $N_2$ Rinse Line Valve |

TABLE 3

| First Train 16a, 18a | Valves | | | | | | | | | | | | | Second Train 16b, 18b |
|---|---|---|---|---|---|---|---|---|---|---|---|---|---|---|
| Process Steps | 1 | 2 | 3 | 4 | 5 | 6 | 7 | 8 | 9 | 15 | 11 | 12 | 13 | 14 Process Steps |
| 16a Pressurization | C | C | O | C | C | C | O | O | O | C | O | C | C | C Evacuation |
| Adsorption | O | O | C | O | C | C | O | O | O | C | O | C | C | C Evacuation |
| Rinse | C | C | C | O | C | C | O | O | O | O | C | C | C | O Evacuation |
| Rinse | C | C | C | O | C | C | O | O | C | O | C | C | O | O 16b Evacuation |

TABLE 3-continued

| First Train 16a, 18a | Valves | | | | | | | | | | | | | Second Train 16b, 18b |
|---|---|---|---|---|---|---|---|---|---|---|---|---|---|---|
| Process Steps | 1 | 2 | 3 | 4 | 5 | 6 | 7 | 8 | 9 | 15 | 11 | 12 | 13 | 14 Process Steps |
| | | | | | | | | | | | | | | and 18b Pressurization |
| Evacuation | C | C | O | C | C | O | C | O | O | C | C | C | O | C 16b Pressurization |
| Evacuation | O | O | C | C | O | O | C | O | O | C | C | C | O | C Adsorption |
| Evacutaion | C | C | C | C | O | O | C | O | O | C | C | O | C | O Rinse |
| 16a Evacuation and 18a Pressurization | C | C | C | C | O | O | C | C | O | C | O | O | C | O Rinse |

What is claimed is:

1. The method of controlling a vacuum swing adsorption process having (1) an adsorption step during which atmospheric air is introduced into at least one train of beds comprising in sequence, a pretreatment bed and an air fractionation bed that provides selective adsorption for separate recovery of high purity nitrogen and oxygen-enriched product gas, (2) a rinse step during which said train of beds becomes saturated with high purity nitrogen, (3) an evacuation step during which nitrogen-enriched gas is withdrawn from said train of beds, and (4) a pressurization step during which the pressure in said train of beds is raised to near ambient pressure level and comprising the further steps of:
   (a) sensing the percent composition of atmospheric air as it passes through said train of beds during said adsorption step and detecting when a predetermined high level oxygen composition is obtained, and terminating said adsorption step in response only to said detection of high level oxygen and independently of temperature,
   (b) sensing the percent composition of said high purity nitrogen in said train during said rinse step and detecting when a predetermined low level oxygen composition is obtained, and terminating said rinse step in response thereto,
   (c) sensing the level of pressure in said train during said evacuation step and detecting when predetermined subatmospheric pressure levels are obtained for terminating evacuation in first, said air fractionation bed, and second, said treatment bed, and
   (d) sensing the pressure level in said pretreatment bed during pressurization of said pretreatment bed and detecting when a predetermined pressure level is obtained, and terminating said pressurization step in said train in response thereto.

2. The method of claim 1 in which there is provided a further step of maintaining the gas flow rate substantially constant during the steps of (a) adsorption and (b) rinse.

3. The method of claims 1 or 2 in which step (c) includes controlling the termination of air fractionation bed evacuation so that the time duration of evacuation in response to the pressure in the bed is at least equal to the combined duration of steps (a) adsorption, (b) rinse, and (d) pressurization.

4. The method of claim 3 in which step (c) includes terminating evacuation in said pretreatment bed upon passage of predetermined amount of time after terminating evacuation of said air fractionation bed.

5. The method of claim 1 in which step (d) includes the step of terminating said pressurization step in said train when the predetermined pressure level in said pretreatment bed is close to or equal to ambient pressure but at least 650 Torr.

6. The method of claim 1 in which step (c) includes the step of terminating evacuation in said air fractionation bed when the predetermined subatmospheric level in said air fractionation bed is 40–200 Torr.

7. The method of claim 1 in which step (c) includes the step of terminating evacuation in said pretreatment bed when said predetermined subatmospheric level in said pretreatment bed is 10–100 Torr.

8. The method of claim 1 in which step (a) includes terminating said adsorption step when the predetermined high level oxygen composition is 70 percent or above.

9. The method of claim 1 in which step (b) includes terminating said rinse step when the predetermined low level oxygen composition is 15 percent or below.

10. A system for controlling a vacuum swing adsorption process having (1) an adsorption step during which atmospheric air is introduced into at least one train of beds comprising a pretreatment bed and an air fractionation bed that provides selective adsorption for separate recovery of high purity nitrogen and oxygen-enriched product gas, (2) a rinse step during which said train of beds becomes saturated with high purity nitrogen, (3) an evacuation step during which nitrogen-enriched gas is withdrawn from the train of beds, and (4) a pressurization step during which the pressure in the train of beds is raised to near ambient pressure level, said system comprising:
   means for sensing the percent composition of atmospheric air as it passes through said train of beds during said adsorption step, said percent composition sensing means including means for terminating said adsorption step in response only to a detection of a predetermined high level oxygen composition and independently of temperature,
   said percent composition sensing means including means for terminating said rinse step when a predetermined low level oxygen composition is detected,
   means for determining the level of pressure in said train during said evacuation step, said determining means including means for terminating evacuation first, in said air fractionation bed, and second, in said pretreatment bed when predetermined subatmospheric pressure levels are obtained, and
   means for sensing the pressure level in said pretreatment bed during pressurization in said pretreatment bed, said sensing means including means for terminating the pressurization step in said train when a predetermined pressure level is detected.

11. The system of claim 10 in which there is provided means for maintaining the gas flow rate into the train substantially constant during the steps of adsorption and rinse.

12. The system of claims 11 or 12 in which the train pressure level determining means includes means for controlling the termination of evacuation in said air fractionation bed so that the time duration of evacuation is at least equal to the combined durations of adsorption, rinse, and pressurization.

13. The system of claim 12 in which evacuation terminating means includes means for terminating evacuation in said pretreatment bed upon passage of a predetermined amount of time after evacuation is terminated in said air fractionation bed.

14. The system of claim 10 in which said sensing means includes means for terminating said pressurization step in said train when the predetermined pressure level in said pretreatment bed is close to or equal to ambient pressure but at least 650 Torr.

15. The system of claim 10 in which said evacuation terminating means includes means for terminating evacuation in said air fractionation bed when the predetermined subatmospheric level in said air fractionation bed is 40–200 Torr.

16. The system of claim 10 in said evacuation terminating means includes means for terminating evacuation in said pretreatment bed when the predetermined subatmospheric level in said pretreatment bed is 10–100 Torr.

17. The system of claim 10 in which step adsorption terminating means includes means for termimating adsorption when the predetermined high level oxygen composition is 70 percent or above.

18. The system of claim 10 in which said rinse terminating means includes means for terminating rinse when the predetermined low level oxygen composition is 15 percent or blow.

* * * * *